UNITED STATES PATENT OFFICE.

ARTHUR LÜTTRINGHAUS, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

PIGMENT.

968,376.  Specification of Letters Patent.  Patented Aug. 23, 1910.

No Drawing.   Application filed June 22, 1909.   Serial No. 503,639.

*To all whom it may concern:*

Be it known that I, ARTHUR LÜTTRINGHAUS, doctor of philosophy and chemist, a subject of the King of Prussia, residing at Ludwigshafen-on-the-Rhine, Germany, have invented new and useful Improvements in Pigments, of which the following is a specification.

My invention consists in a new composition of matter suitable for use as a pigment or lake.

I have discovered that naphthanthraquinon when mixed with substrata (such for instance as alumina, china clay, and blanc fixe) yields valuable pigments or lakes, which have a good yellow shade and are fast against the action of water, lime, light, alcohol, and oil. They also have good covering power. Naphthanthraquinon can be prepared as described in the *Berichte der Deutschen Chemischen Gesellschaft*, vol. 19, page 2209. Instead of naphthanthraquinon, its homologues and derivatives, such for instance as methyl-naphthanthraquinon and halogenated naphthanthraquinon, and in particular chlor-naphthanthraquinon, can be employed and similar results be obtained. The aforesaid homologues and derivatives can be obtained for instance by condensing phthalic anhydrid with a homologue, or a derivative, of naphthalene, or by condensing a substituted phthalic anhydrid with naphthalene, or with a homologue, or derivative, thereof. Halogen derivatives can be obtained by treating naphthanthraquinon with halogen, or with a compound which evolves halogen.

It is preferred to make use of the naphthanthraquinon, or its homologue, or derivative, in a fine state of division. In order to obtain it in such fine state of division, the naphthanthraquinon or naphthanthraquinon compound can be dissolved in concentrated sulfuric acid, the solution be poured into ice and water, and the precipitate be filtered off and washed with hot dilute caustic alkali solution.

The halogenated naphthanthraquinons used according to my invention are new and are claimed in a separate Patent No. 941,320.

The following are examples of pigments or lakes according to my invention, which, however, is not confined to these examples. The parts are by weight.

Example 1: Mix well together a paste containing five parts of naphthanthraquinon and fifty parts of a four and a half per cent. aluminium hydroxid paste, filter and dry, and then grind the product obtained. It is very suitable for lithographic and three-color-process printing inks.

Example 2: Mix well together one hundred parts of barium sulfate and a paste containing ten parts of naphthanthraquinon, and then dry and grind the product, which is suitable for use in the form of a paint.

Example 3: Mix well together ten parts of aluminium sulfate, twenty parts of barium sulfate, and a paste containing five parts of naphthanthraquinon, and to the homogeneous mixture obtained add five parts of sodium carbonate. Filter, and press the product, which can be preserved in the form of paste.

In these examples, instead of naphthanthraquinon itself, a homologue or derivative thereof can be employed.

Now what I claim is:—

1. The new composition of matter containing a naphthanthraquinon body and a substratum, adapted for use as a pigment having a yellow shade, and being fast against the action of water, lime, light and oil.

2. The new composition of matter containing a naphthanthraquinon body and barium sulfate, adapted for use as a pigment having a yellow shade, and being fast against the action of water, lime, light and oil.

3. The new composition of matter containing naphthanthraquinon and barium sulfate, adapted for use as a pigment having a yellow shade, and being fast against the action of water, lime, light and oil.

4. The new composition of matter containing ten parts of naphthanthraquinon and one hundred parts of barium sulfate, adapted for use as a pigment having a yellow shade, and being fast against the action of water, lime, light and oil.

In testimony whereof I have hereunto set my hand in the presence of two subscribing witnesses.

ARTHUR LÜTTRINGHAUS.

Witnesses:
ERNEST G. EHRHARDT,
J. ALEC. LLOYD.